H. G. SLINGLUFF.
GLASS CASTING APPARATUS.
APPLICATION FILED JAN. 15, 1913.
1,214,089.
Patented Jan. 30, 1917.
3 SHEETS—SHEET 1.
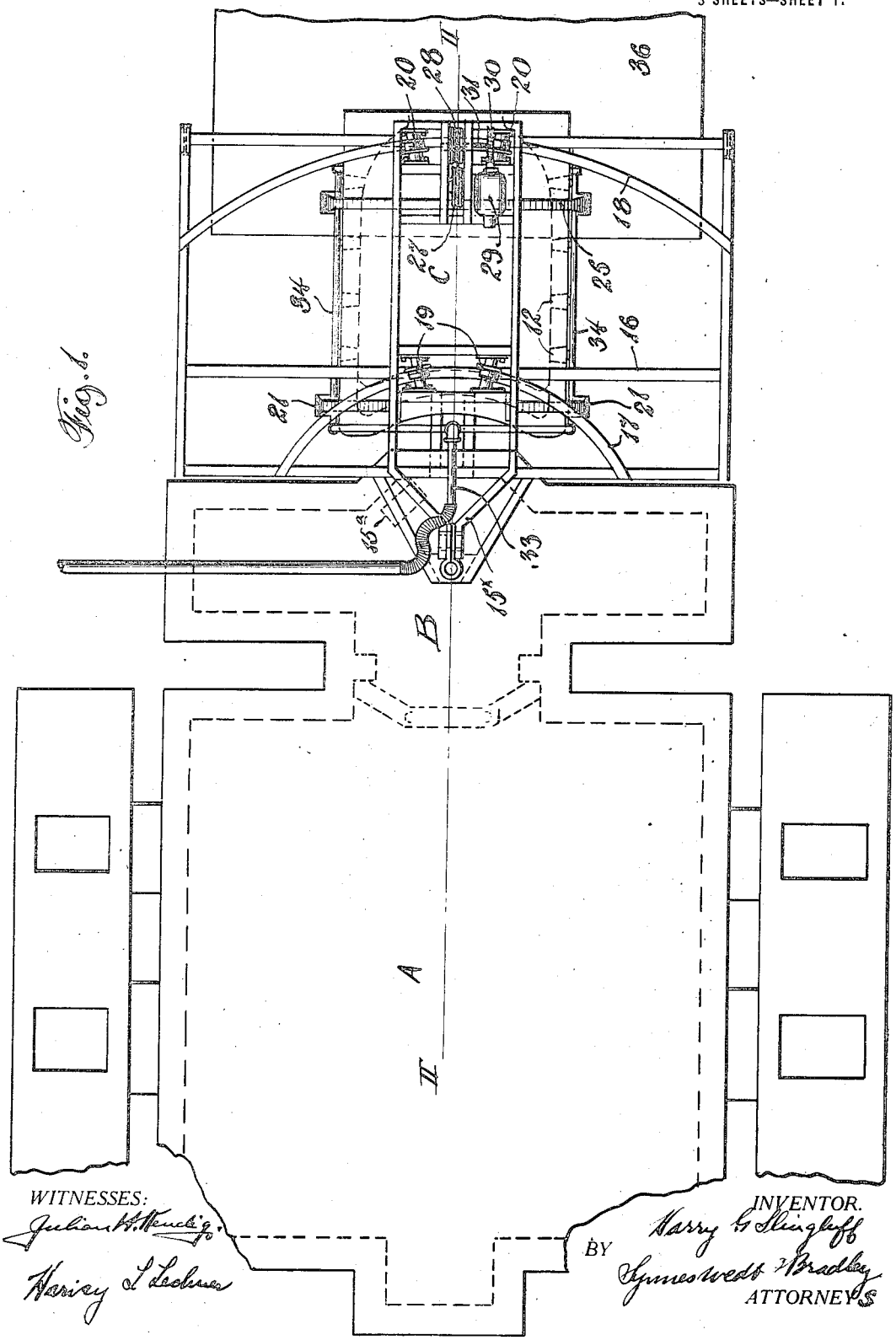

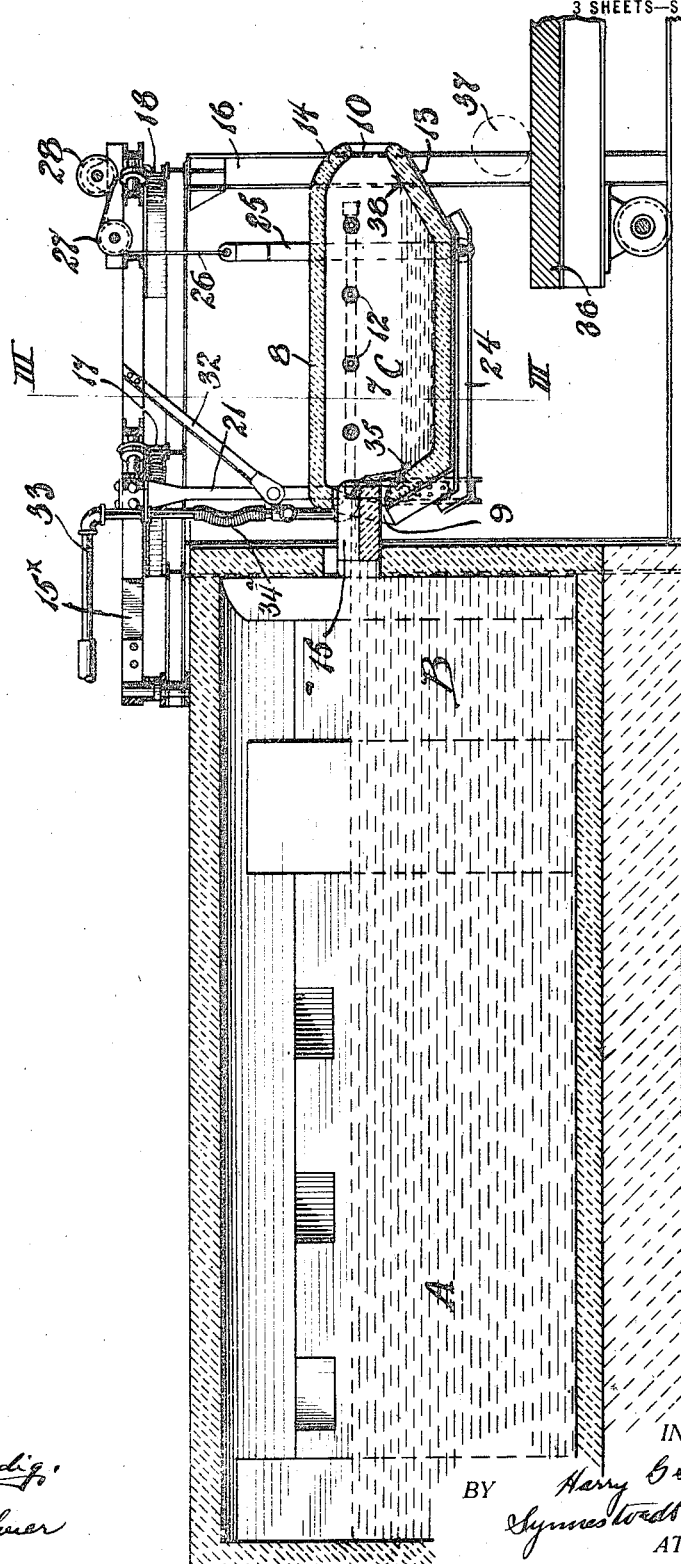

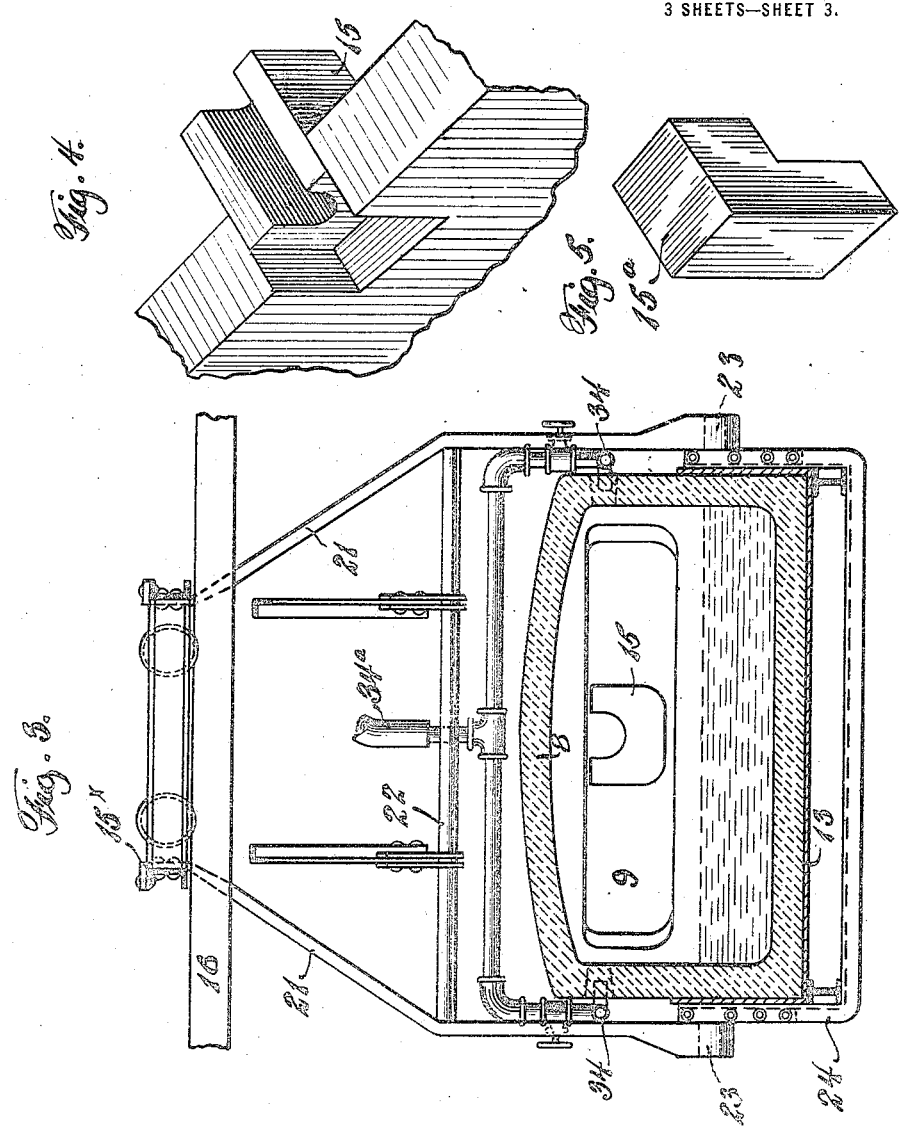

UNITED STATES PATENT OFFICE.

HARRY G. SLINGLUFF, OF MOUNT VERNON, OHIO, ASSIGNOR TO PITTSBURGH PLATE GLASS COMPANY, OF PITTSBURGH, PENNSYLVANIA, A CORPORATION OF PENNSYLVANIA.

GLASS-CASTING APPARATUS.

1,214,089.　　　　Specification of Letters Patent.　　Patented Jan. 30, 1917.

Application filed January 15, 1913. Serial No. 742,148.

*To all whom it may concern:*

Be it known that I, HARRY G. SLINGLUFF, a citizen of the United States, residing at Mount Vernon, in the county of Knox and State of Ohio, have invented certain new and useful Improvements in Glass-Casting Apparatus, of which the following is a specification.

This invention has reference to glass casting apparatus, such as used for example in the manufacture of plate glass and it has as one of its primary objects the provision of apparatus whereby the molten glass from the melting tank is delivered to the point of casting in a condition best suited for the casting operation, thereby insuring a product of superior quality. My invention contemplates the delivery of the glass with the least possible amount of agitation, thereby reducing the liability of the presence of air bubbles or blisters, and also the maintenance of the proper temperature conditions until the molten glass is actually delivered.

In accomplishing the above-enumerated objects, I not only obtain a superior product but cheapen the cost of production through the simplification of the apparatus and saving in time effected over apparatus ordinarily employed in similar use.

Other features of the invention reside in provision of means whereby a substantially unbroken supporting surface is provided for the molten glass to the point of casting; the provision of improved means for spreading a charge of molten glass across the casting table; and the provision of an accumulating tank together with means for effectively heating it and means for effecting an intermittent discharge of glass therefrom.

The foregoing together with such other objects as may hereinafter appear or are incident to my invention I attain by means of a construction illustrated in preferred form in the accompanying drawings wherein:

Fig. 1 is a plan view of my improved arrangement of casting apparatus as applied to the casting of plate glass.

Fig. 2 is a section on the line II—II of Fig. 1; Fig. 3 is an enlarged section taken on the line III—III of Fig. 2; and Figs. 4 and 5 are perspectives of details of my invention.

In carrying out my invention, I preferably employ a chain of three tanks, A. B and C. A represents a glass melting tank or furnace which is of the usual construction and is supplied with heat in any preferred manner. The melted glass flows from tank A into a refining tank B wherein the glass settles and becomes substantially uniform in temperature. From the refining tank B the metal flows into what I term an accumulating tank, the tank C above referred to, in which the glass can be constantly maintained at any preferred temperature found suitable for the particular casting operations in hand. The primary features of my invention reside in the provision of this accumulating tank and a detailed description thereof will now be presented.

The tank comprises a chamber 7 which is substantially closed over by a roof 8 and which is provided with an inlet opening 9 at one end and an outlet or discharge opening 10 at the other end. The openings are relatively restricted so it will be clear that the tank is in effect a closed chamber and that by virtue thereof the molten glass entering from the refining tank can be maintained at any suitable temperature. Heat is supplied to the tank by burners 12 arranged on both sides of the tank. The tank is preferably composed of a metal shell 13 lined with fire clay 14 and is so constructed that the lining can be renewed. The tank is supported in such manner that the spout 15 of the refining tank B projects into the inlet opening 9 while at the same time swinging movement both vertically and horizontally is permitted, as will hereinafter further appear.

The supporting mechanism comprises an overhead frame or boom 15[x] which is pivoted at its inner end to the structural framework 16 on which is also mounted a pair of concentric tracks 17 and 18. The boom has two sets of rollers or wheels 19 and 20 which engage the tracks and permit of a swinging movement of the boom about its pivot. Toward the rear end, the boom is provided with two depending bars 21 which are suitably braced by means of the truss rod 22 against collapsing inwardly and have their ends socketed to receive the pivot pins 23 of a saddle frame 24 on which the tank C is carried. The pivot point of the saddle frame is substantially at the rear edge of the tank so that the front end of the tank can be freely lowered without imparting sufficient motion to the rear end to cause the tank to strike against the spout 15. The front end of the saddle frame 24 is supported from the boom by the yoke 25 pivoted to the saddle frame, and the cable 26 which passes over the pulley 27 to a drum 28 which is rotated by a motor 29 through a worm gear 30 and shaft 31. It will be obvious that through this operating mechanism, the front end of the tank C may be raised or lowered as may be desired. The bars 21 are braced by the angle irons 32. All of the supporting framing is made of structural sections of sufficient strength to provide adequate support for the tank. Fuel for the burners is provided by the pipe 33 and branch pipes 34 which are carried by the tank and have a flexible connection 34ᵃ to the pipe 33, the latter being flexibly connected to any suitable supply pipe.

The operation of the apparatus is as follows: The molten glass from the refining tank flows through the spout 15 on to the inclined inner surface 35 at the rear of the accumulating tank C, the flow being continuous while the apparatus is in use. When the tank has a sufficient quantity of glass, the casting table 36 is brought into position beneath the front end of the tank and the said end is lowered by means of the motor 29 and a portion of the glass is discharged out of the opening 10 onto the casting table. The quantity discharged for a casting operation is but a small portion of the glass in the tank, as I contemplate making the tank of such size that there will always be a considerable quantity of hot metal therein so that the temperature of the tank will not vary but will normally remain approximately at a predetermined figure. It will be obvious that the presence of a large quantity of hot metal in the tank will resolve the maintenance of the temperature at the desired degree to a mere matter of regulation of the burners.

When sufficient glass has been deposited on the table, the tank is elevated and the flow from the opening 10 ceases. The glass is then rolled by a roll 37 in the usual manner and drawn to one side and the operation is repeated. It will be clear that the flow from the refining tank continues during the discharge of the tank C, this being of importance as it assists in keeping the temperature in the tank more uniform.

If it is desired to distribute the metal across the casting table, the boom 15 is rotated about its axis and of course carries with it the tank C. When the apparatus is not in use, the block 15ᵃ is drawn into position to close off the spout.

In order to effect the delivery of the glass from the melting tank to the casting table with the least amount of agitation possible, the tank and its supporting mechanism are so arranged that regardless of the angular position of the tank either vertically or horizontally, the glass discharging into it will always roll down the inclined surface 35 to the bottom of the tank. The inner surface 38 leading to the discharge opening is also inclined to eliminate agitation of the glass.

It will be apparent from the foregoing that the manner in which the glass is supplied to the tank permits of the intermittent discharge of the tank without disturbing temperature conditions, and this together with the evenness of the flow and the absence of agitation, results in the delivery of the glass in condition most suitable for the casting and obtains superiority of product and reduces the liability of blisters or air bubbles and other defects to a minimum. It will be clear that the apparatus is simple and convenient in operation and effects a saving in time and labor with a consequent diminution of the cost of production. A further advantage resides in the fact that the spout 15 is practically enshrouded by the tank whereby cooling of the metal as it flows through the spout is prevented.

Having thus described my invention and illustrated its use, what I claim as new and desire to secure by Letters Patent is the following:—

1. In combination in a glass pouring apparatus, a supply tank containing molten glass, and a tilting tank adjacent thereto into which the glass from the supply tank is continuously supplied in a relatively small stream at the rear end and from the front end of which the glass discharges when the tank is tilted, said tilting tank being mounted on fixed pivots at the rear end thereof which receives the glass so that when the front end is lowered such rear end is not materially changed in vertical position.

2. In combination in a glass pouring apparatus, a supply tank containing molten glass and provided with a laterally projecting discharge spout, a closed tilting tank provided at the front end with a discharge orifice and at the rear end with an opening through which the said spout projects, and means for heating the glass in the tilting tank, the said tilting tank having its pivotal support at the rear end thereof and so positioned that such rear end is not materially changed in vertical position by the lowering of the front end of the tank.

3. In combination in glass pouring apparatus, a supply tank containing a relatively large supply of molten glass, a tilting tank in position to receive the glass discharged from the supply tank and means whereby the tilting tank may be tilted to discharge a quantity of glass, the wall of the tilting tank upon which the stream of glass from the supply tank falls being inclined both when the tank is in tilted or pouring position and when it is in normal or untilted position, and being located in both positions so as to receive a flow of glass.

In testimony whereof I have hereunto signed my name in the presence of the two subscribed witnesses.

HARRY G. SLINGLUFF.

Witnesses:
 BANNER M. ALLEN,
 THOS. E. DAUGHERY.